United States Patent [19]
Wise

[11] Patent Number: 5,956,918
[45] Date of Patent: Sep. 28, 1999

[54] AUTOMOBILE DOOR PROTECTOR

[75] Inventor: Kevin Wayne Wise, 2508 Beechmont Ave., Cincinnati, Ohio 45230

[73] Assignee: Kevin Wayne Wise, Cincinnati, Ohio

[21] Appl. No.: 08/990,976

[22] Filed: Dec. 15, 1997

[51] Int. Cl.⁶ .................................................. B60J 11/00
[52] U.S. Cl. .................... 52/716.5; 24/306; 52/716.7; 52/718.04; 52/DIG. 13; 280/770; 293/128
[58] Field of Search ............... 52/716.1, 716.5, 52/716.6, 716.7, 717.03, 718.04, DIG. 13, DIG. 12; 24/306, 442; 224/400, 539, 556, 543, 901.4, 907; 280/770; 293/128, 126; 428/31

[56] References Cited

U.S. PATENT DOCUMENTS

| | | | |
|---|---|---|---|
| 3,309,129 | 3/1967 | Newman et al. | 52/716.5 X |
| 4,002,363 | 1/1977 | James | 293/128 |
| 4,014,583 | 3/1977 | Forbes | 293/128 |
| 4,560,596 | 12/1985 | Coscia | 52/716.5 X |
| 4,690,446 | 9/1987 | Warren | 293/128 |
| 4,707,008 | 11/1987 | Falco | 52/716.5 X |
| 4,708,380 | 11/1987 | Cruz | 293/128 |
| 4,726,614 | 2/1988 | Myers et al. | 293/128 |
| 4,801,479 | 1/1989 | Fielder et al. | 52/716.5 X |
| 4,871,205 | 10/1989 | Bray | 293/128 |
| 5,320,392 | 6/1994 | Hart | 293/128 |

*Primary Examiner*—Carl D. Friedman
*Assistant Examiner*—Kevin D. Wilkens

[57] ABSTRACT

An automobile door protection device including an elongated cushion, the ends of which are connected to flexible stop through a pair of elastic straps. The straps which have VELCRO hook and loop fasteners attached to them near the flexible stops that work with corresponding VELCRO hook and loop fasteners permanently attached to the inside edge of the automobiles door to allow the cushion to fit tightly against the outside surface of the automobiles door. These VELCRO hook and loop fasteners also work to hold the cushion in a set position. The VELCRO hook and loop fasteners and flexible stops are placed on the inside edge of the automobiles door in the space between the automobile door and automobile side body panel. The automobiles door is then closed, trapping the flexible stops so that the device can not be removed.

4 Claims, 2 Drawing Sheets

AUTOMOBILE DOOR PROTECTOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention is a protective device for the door of automobiles and trucks, to be used while the vehicle is parked.

Automobile and truck doors are susceptible to damage while parked do to objects striking the vehicle. Objects such as shopping carts and other vehicle doors striking a vehicle can cause dents and scratches to the doors of an automobile or truck. This invention will prevent some of this damage. Prior devices for protecting a vehicles door from damage have had several disadvantages. One major disadvantage is that some devices are permanently attached to the vehicles door. Thus if they are damaged, they to would give the vehicle a lesser appearance. Also these devices are both costly and difficult to repair or replace. Other devices that are not permanently attached to a vehicle have had no way of securing them to the vehicle and can be easily stolen.

BRIEF SUMMARY OF THE INVENTION

This invention is directed to a cushion to absorb the impact of an object striking the door of an automobile or truck. The object of the present invention is to provide an easily attachable and detachable cushion for absorbing impact to the door of an automobile or truck.

The automobile door protection device comprises an elongated cushion to fit horizontally about the outside of a vehicles door. Attached to each end of the cushion is an elastic strap with a flexible stop attached at the opposing end. The flexible stop is used to secure the door protection device to the vehicle. The stop is positioned at the inside edge of the vehicles door and held there by a VELCRO hook and loop fastener that is also attached to the strap. This VELCRO hook and loop fastener works in conjunction with VELCRO hook and loop fastener that has been permanently attached to the inside of the door using adhesive. Once the flexible stop has been positioned and the vehicles door is closed the stop becomes trapped between the vehicles door and body and can not be removed.

DETAILED DESCRIPTION OF THE INVENTION

Figure 1:
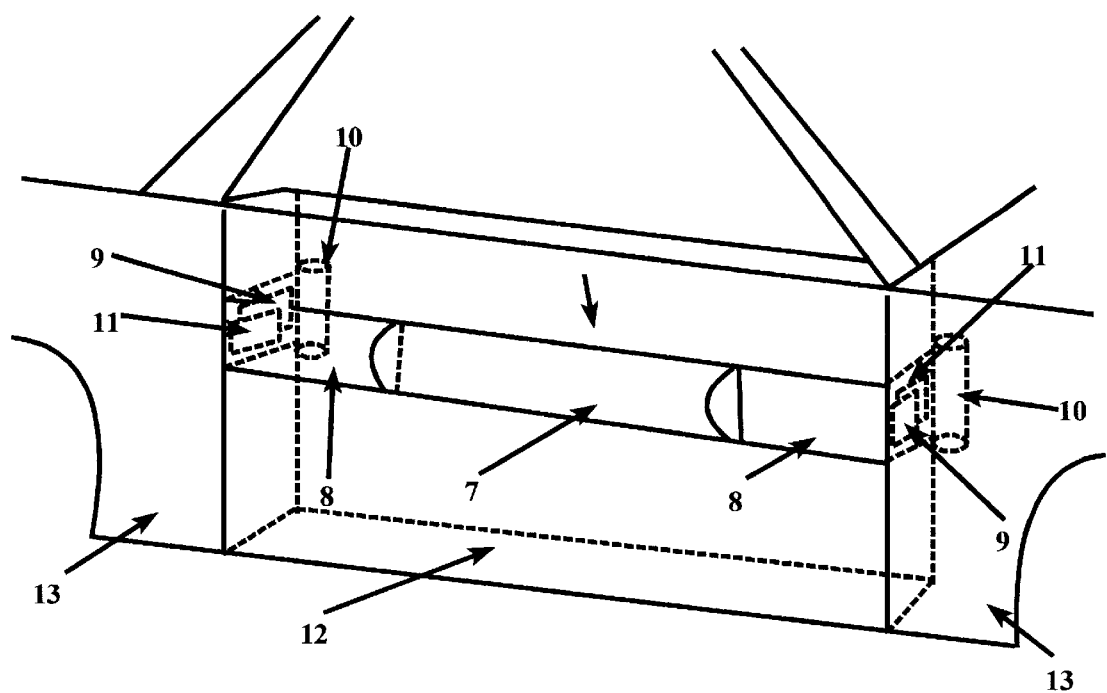
FIG. 1 is a perspective view of the automobile door protection device used to protect the door of an automobile from dents and scratches located in operative engagement with the door of an automobile.
Figure 2:
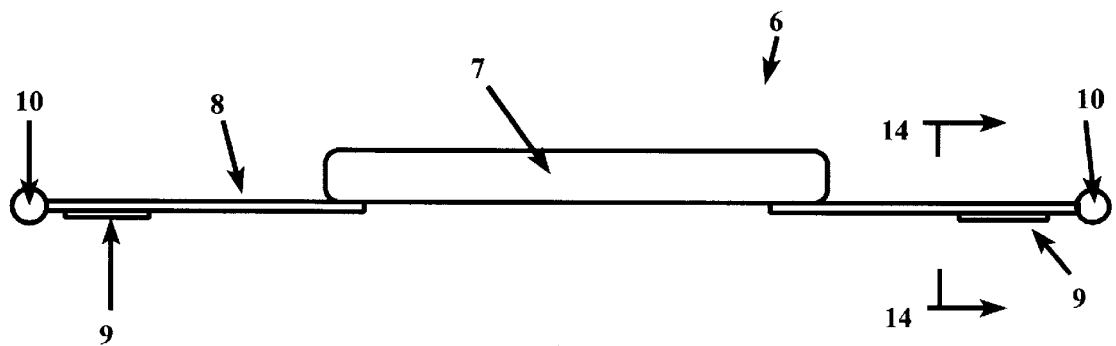
FIG. 2 is a plan view of the automobile door protection device of FIG. 1.
Figure 3:
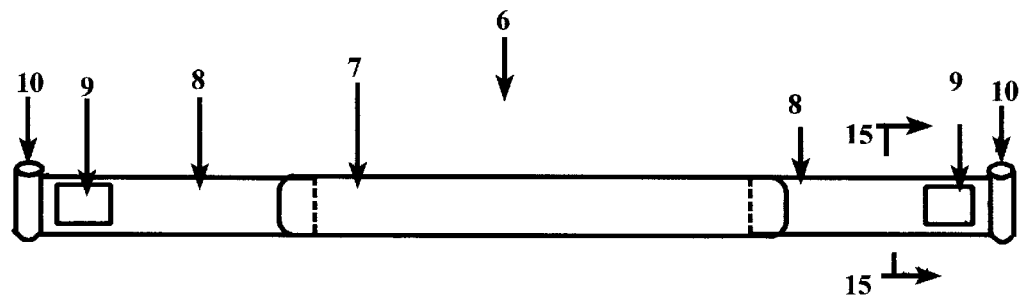
FIG. 3 is a side view of the automobile door protection device of FIG. 1.
Figure 4:
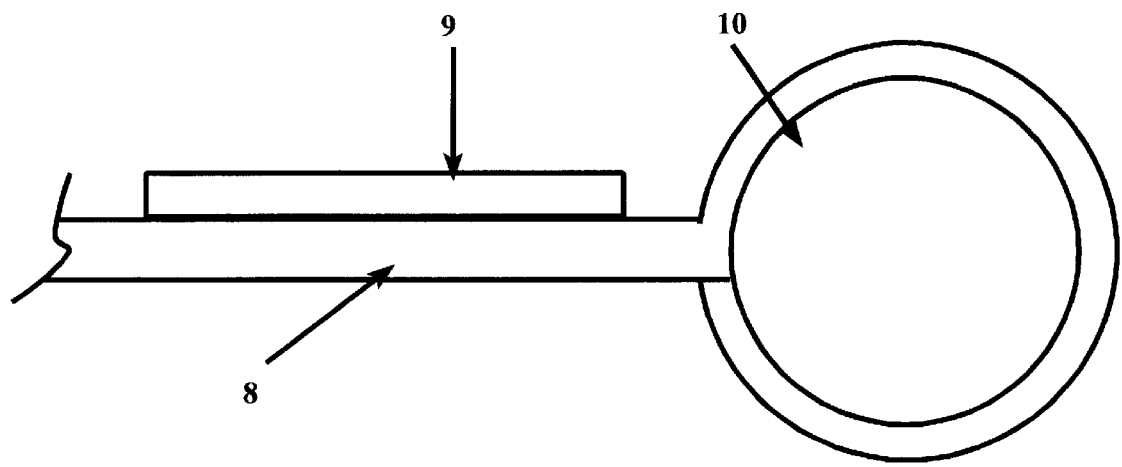
FIG. 4 is an enlarged view of the elastic strap, VELCRO hook and loop fastener, and flexible stop assembly taken along the line 15—15 of FIG. 3.
Figure 5:
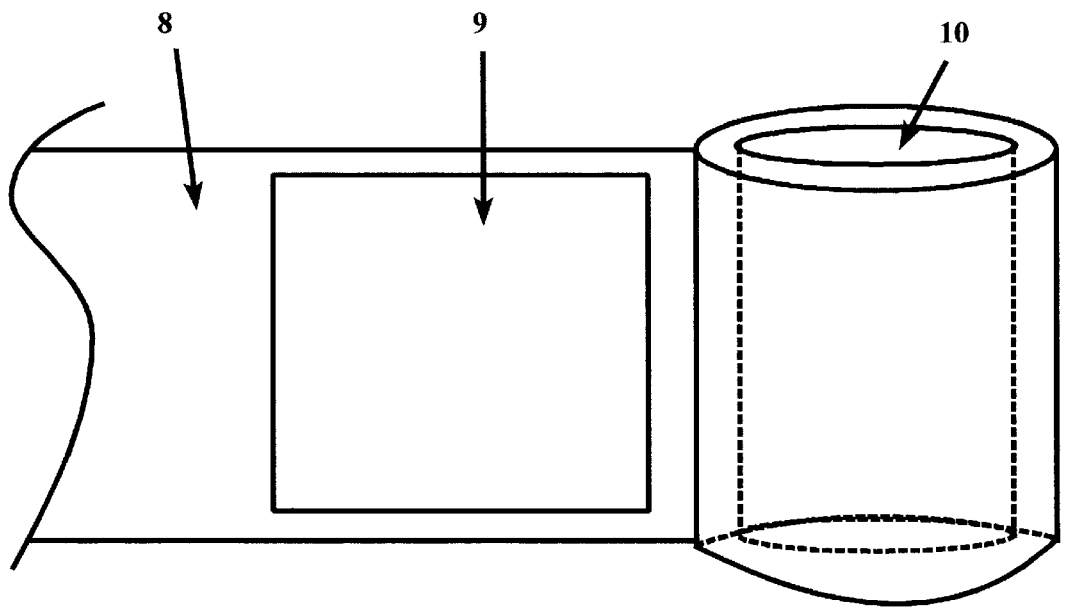
FIG. 5 is an enlarged view of the elastic strap, VELCRO hook and loop fastener, and flexible stop taken along the line 14—14 of FIG. 2.

Referring to FIG. 1, an automobile door protection device indicated generally at 6, is used to protect an automobiles door 12 from dents and scratches. The device 6 consist of an elongated cushion 7 that has an elastic strap 8 attached to each end. At the end of each elastic strap 8 is cylindrical, a flexible stop 10. These flexible stops 10 are made of a pliable material that can conform to a shape and size necessary to fit in space between an automobiles door 12 and automobile side body panel 13 when the automobiles door 12 is in the closed position. Once the flexible stop 10 is placed into position and the automobiles door 12 is closed the flexible stop 10 becomes trapped between the automobile door 12 and automobile side body panel 13 and can not be removed until the automobile door 12 is opened again. When flexible stop 10 is removed it returns to it original shape. Also attached to each elastic strap 8 near flexible stops 10 is a VELCRO hook and loop fastener 9. These VELCRO hook and loop fasteners 9 work with mating VELCRO hook and loop fasteners 11 that have been permanently attached to each end of automobile door 12 , in the space where automobile door 12 and automobile side body panel 13 meet. The device works by opening automobile door 12 which enlarges the space where automobile door 12 and automobile side body panel 13 meet. The end of one of the elastic straps 8 that has the flexible stop 10 and VELCRO hook and loop fastener 9, is placed in this now enlarged space where VELCRO hook and loop fastener 9 mates with VELCRO hook and loop fastener 11 to hold flexible stop 10 in position. The elongated cushion 7 is placed flat against the outside surface of automobile door 12 and the second elastic strap 8 is pulled to opposite end of automobile door 12 so that flexible stop 10 can be placed into position and held there by mating the second VELCRO hook and loop fastener 9, that is attached to the second elastic strap 8 with the second VELCRO hook and loop fastener 11 that is attached to automobile door 12. Once elongated cushion 7 and flexible stops 10 have been placed into position and held there with VELCRO hook and loop fasteners 9, and VELCRO hook and loop fasteners 11, and automobile door 12 is closed the device 6 can not be removed until automobile door 12 is opened again.

While there has been shown and described a preferred embodiment of the automobile door protection device of this invention, it is understood that changes in structure, materials, sizes, and shapes can be made by those skilled in the art without departing from the invention. The invention is defined in the following claims.

I claim:

1. A removably attachable protective cushion adapted for temporary installation to the outside surface of an automobile's door to protect said door from dents and scratches while the automobile is parked, comprising:

an elongated cushion adapted to fit about the outside of said door; and first and second elongated straps secured to said elongated cushion, each strap having a cylindrical, flexible stop made of pliable material secured to an end thereof;

each flexible stop adapted to be placed between said door and a side body panel of the automobile to secure said elongated cushion to said door.

2. The protective cushion of claim 1, wherein said first and second elongated straps are elastic, and each strap is secured to a respective end of said elongated cushion.

3. The protective cushion of claim 1, further comprising hook and loop fasteners secured to the first and second elongated straps.

4. The protective cushion of claim 3, wherein each said hook and loop fastener includes one half of a hook and loop fastener secured to the first and second elongated straps, and a second half of a mating hook and loop fastener adapted to be permanently adhered on an inside edge of said door to hold said flexible stops in place between said door and said side body panel.

* * * * *